US012111213B2

(12) United States Patent
Lanzoni et al.

(10) Patent No.: US 12,111,213 B2
(45) Date of Patent: Oct. 8, 2024

(54) THERMAL CAMERA ASSEMBLY AND CONTROL SYSTEM AND METHOD FOR CONTROLLING AN INDUSTRIAL PRODUCTION PROCESS COMPRISING A THERMAL CAMERA ASSEMBLY

(71) Applicant: Marposs Societa' Per Azioni, Bentivoglio (IT)

(72) Inventors: Daniele Lanzoni, Cento (IT); Matteo Venturi, Imola (IT); Antonio De Renzis, San Giorgio di Piano (IT); Fabio Goretti, Cento (IT); Fabio Giannuzzi, Sternatia (IT)

(73) Assignee: Marposs Societa' Per Azioni, Bentivoglio (IT)

( * ) Notice: Subject to any disclaimer, the term of this patent is extended or adjusted under 35 U.S.C. 154(b) by 279 days.

(21) Appl. No.: 17/764,809

(22) PCT Filed: Nov. 20, 2020

(86) PCT No.: PCT/EP2020/082868
§ 371 (c)(1),
(2) Date: Mar. 29, 2022

(87) PCT Pub. No.: WO2021/099559
PCT Pub. Date: May 27, 2021

(65) Prior Publication Data
US 2022/0326084 A1    Oct. 13, 2022

(30) Foreign Application Priority Data

Nov. 22, 2019  (IT) .......................... 102019000021861
Nov. 22, 2019  (IT) .......................... 102019000021864

(51) Int. Cl.
*G01J 5/04*    (2006.01)
*G01J 5/00*    (2022.01)
(Continued)

(52) U.S. Cl.
CPC .............. *G01J 5/048* (2013.01); *G01J 5/026* (2013.01); *G01J 5/0875* (2013.01); *G01J 2005/0077* (2013.01)

(58) Field of Classification Search
CPC .......... G01J 5/048; G01J 5/026; G01J 5/0875; G01J 2005/0077; G01J 5/0295; G01J 5/061; G01J 5/025; G01J 5/04; G01J 5/48
See application file for complete search history.

(56) References Cited

U.S. PATENT DOCUMENTS

2014/0085482 A1*  3/2014  Teich .................. H04N 25/702
                                                   348/164

FOREIGN PATENT DOCUMENTS

WO    WO 2004/011891 A2    2/2004
WO    WO 2016/199057 A2    12/2016

* cited by examiner

*Primary Examiner* — David P Porta
*Assistant Examiner* — Meenakshi S Sahu
(74) *Attorney, Agent, or Firm* — Blank Rome LLP

(57) ABSTRACT

Thermal camera assembly (1) comprising a thermal imaging detector (3) providing thermographic images and/or recordings, a protective casing (2) which houses the thermal imaging detector and includes a window (5) with a transparent screen (6), one or more sensors (15;16;20;32;33) arranged in the protective casing and providing signals indicative of a physical quantity or a state, one or more actuators (8;22;28) arranged in the protective casing, and a control unit (9) which is integrated in the protective casing. The control unit is directly connected to the thermal imaging detector to receive the thermographic images and/or recordings and transmit them to the outside, to the sensors to receive the relative signals, and to the actuators to control the latter according to the signals received. The control unit is able to manage and control the communication between all the components of the thermal camera and the outside.

(Continued)

The thermal camera assembly is part of a control system for controlling an industrial production process and is used in a relative control method.

24 Claims, 6 Drawing Sheets

(51) Int. Cl.
    *G01J 5/02*          (2022.01)
    *G01J 5/0875*     (2022.01)

THERMAL CAMERA ASSEMBLY AND CONTROL SYSTEM AND METHOD FOR CONTROLLING AN INDUSTRIAL PRODUCTION PROCESS COMPRISING A THERMAL CAMERA ASSEMBLY

TECHNICAL FIELD

The present invention relates to a thermal camera assembly or thermal camera (also called thermographic camera), that is a particular camera which is sensitive to infrared radiation and can therefore obtain thermographic images or recordings showing temperature maps of the surfaces at which the camera points.

The present invention also relates to a control system and method for controlling an industrial production process in an industrial production environment by means of a thermal camera assembly.

The present invention is applied to a thermal camera assembly or thermal camera for controlling or monitoring different kinds of industrial production process. It can be applied, for example, in a foundry to check the temperature of objects such as molds, to hot forming processes and rolling processes to check the temperature changes in the metal subjected to the forming process, to inertia welding processes to check the temperature of welded material, to industrial furnace plants to check the temperature of melted metals and even to additive manufacturing processes.

BACKGROUND ART

A known thermal camera that is used in foundries is for example described in patent application No. WO2004011891A2 or in patent application No. WO2016199057A2 and comprises a thermal imaging detector (sensitive to infrared radiation) and a metal protection casing which houses the thermal imaging detector to protect it both mechanically and thermally.

The protective casing has a detection window, which is closed by a transparent screen and is arranged at the lens of the thermal imaging detector, to allow the thermal imaging detector to see outside the casing. A shutter is hinged outside the casing which rotatably moves from an open position in which the shutter does not cover the detection window to a closed position in which the shutter covers the detection window. A pneumatic actuator controls the position of the shutter so that the shutter is left open only for the time necessary to acquire the thermographic images or recordings.

The protective casing includes a compressed air cooling system that introduces a flow of compressed air into the protective casing. Preferably, the cooling system is equipped with a vortex tube (i.e. a Ranque-Hilsch tube), placed outside the protection casing, which allows to separate a high pressure fluid into two jets which have very different temperature: the hottest jet is directed outside the protective casing while the colder jet is directed inside the protective casing. Inside the protective casing there are also one or more sensors and one or more actuators that contribute to the operation of the thermal camera.

Therefore, a known thermal camera of the type described above requires a pneumatic connection for the compressed air supply and an electrical wiring that transmits both electric power (necessary for example to power the thermal imaging detector and any sensors and actuators) and signals in both directions (i.e. signals from the thermal camera and sensors to a remote controller and also signals from the remote controller to the thermal camera and actuators). Such electrical wiring requires a particularly thick multipolar cable (for example having a diameter close to 30 mm) which is difficult to run in an industrial plant, such as a foundry, due to the presence of several close obstacles that force the multipolar cable to bend into bends with a small curvature radius. Since each component (sensor and/or actuator) housed in the thermal camera is individually connected to the remote controller via dedicated electrical connections for both power supply and signal transmission, it is not possible, to overcome the difficulties in running the cable, to reduce the thickness of the cable that makes all the connections. The use of a thick multipolar cable also implies the use of an equally bulky electrical connector, which connects the cable to the thermal camera.

DISCLOSURE OF THE INVENTION

Object of the present invention is to provide a thermal camera and a control system and a method for controlling an industrial production process which are free from the drawbacks described above and, at the same time, are easy and economical to produce and/or implement.

The present invention provides a thermal camera assembly (or thermal camera) and a control system comprising said thermal camera assembly, according to what is claimed in the attached claims.

The present invention also provides a method for controlling an industrial production process in an industrial production environment comprising a thermal camera assembly, according to what is claimed in the attached claims.

The claims describe embodiments of the present invention and form an integral part of the present description.

BRIEF DESCRIPTION OF THE DRAWINGS

The present invention is now described with reference to the attached drawings, which illustrate a non-limiting example of embodiment, in which.

BEST MODE FOR CARRYING OUT THE INVENTION

Figure 1:
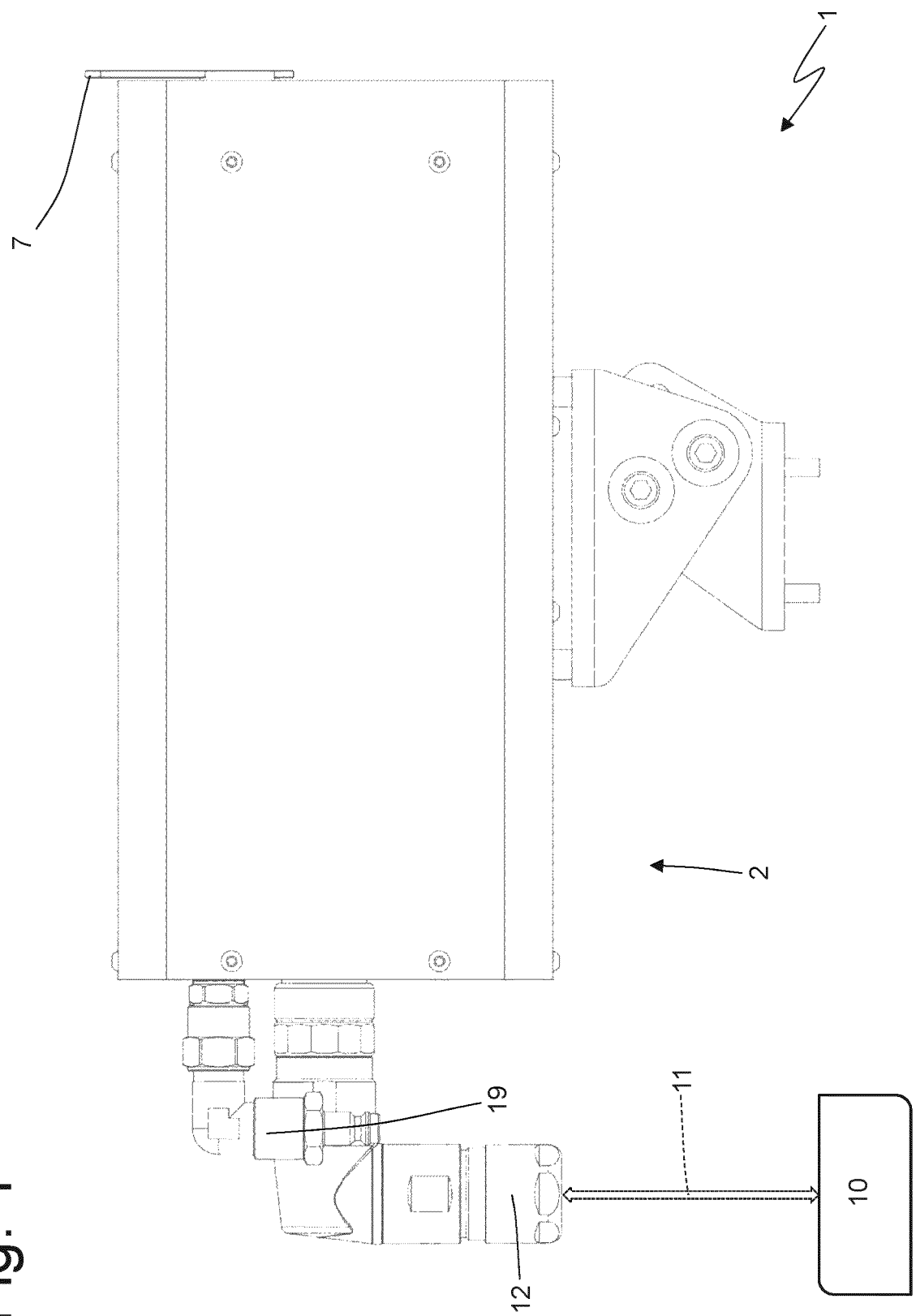
FIG. 1 is a side view of a thermal camera according to the present invention.

In the attached figures, the reference number 1 indicates as a whole a thermal camera assembly or thermal camera 1.

The thermal camera 1 comprises a metal protective casing 2 which can be, for example, a parallelepiped, that has six walls: an upper wall and a lower wall parallel and opposite to each other, two side walls parallel and opposite to each other, a front wall and a rear wall parallel and opposite to each other. The upper, lower and two side walls form a tubular body with two open opposite ends at which the front and rear walls are mounted and locked by respective screws. The parallelepiped shape of the protective casing 2 allows to optimize the arrangement of the components inside the protective casing 2 by minimizing the internal empty space and therefore minimizing the external dimensions of the protective casing 2.

Although the parallelepiped shape is particularly advantageous in terms of overall dimensions, the protective casing 2 can have different shapes, for example cylindrical.

The thermal camera 1 comprises a plurality of internal components of different kinds which are arranged inside the protective casing 2 and which are described in detail herebelow.

The thermal camera 1 comprises a thermal imaging detector 3 (partially visible in FIGS. 4 and 5) which is housed inside the protective casing 2 and is provided with a lens 4 through which thermographic images are acquired. The thermal imaging detector 3 provides images and/or thermographic recordings showing temperature maps of the surfaces at which the thermal imaging detector 3 points, in particular it provides data for generating such images and/or recordings. Generally the spectral range of the thermal imaging detector 3 is SW (short wave infrared, suitable for measuring high temperatures), but obviously the spectral range of the thermal imaging detector 3 could also be different. According to a possible embodiment, the thermal imaging detector 3 could comprise a sensitive element of the flat matrix microbolometric type.

The thermal imaging detector 3 can be a per se known device, for example a commercial thermographic camera.

Figure 2:
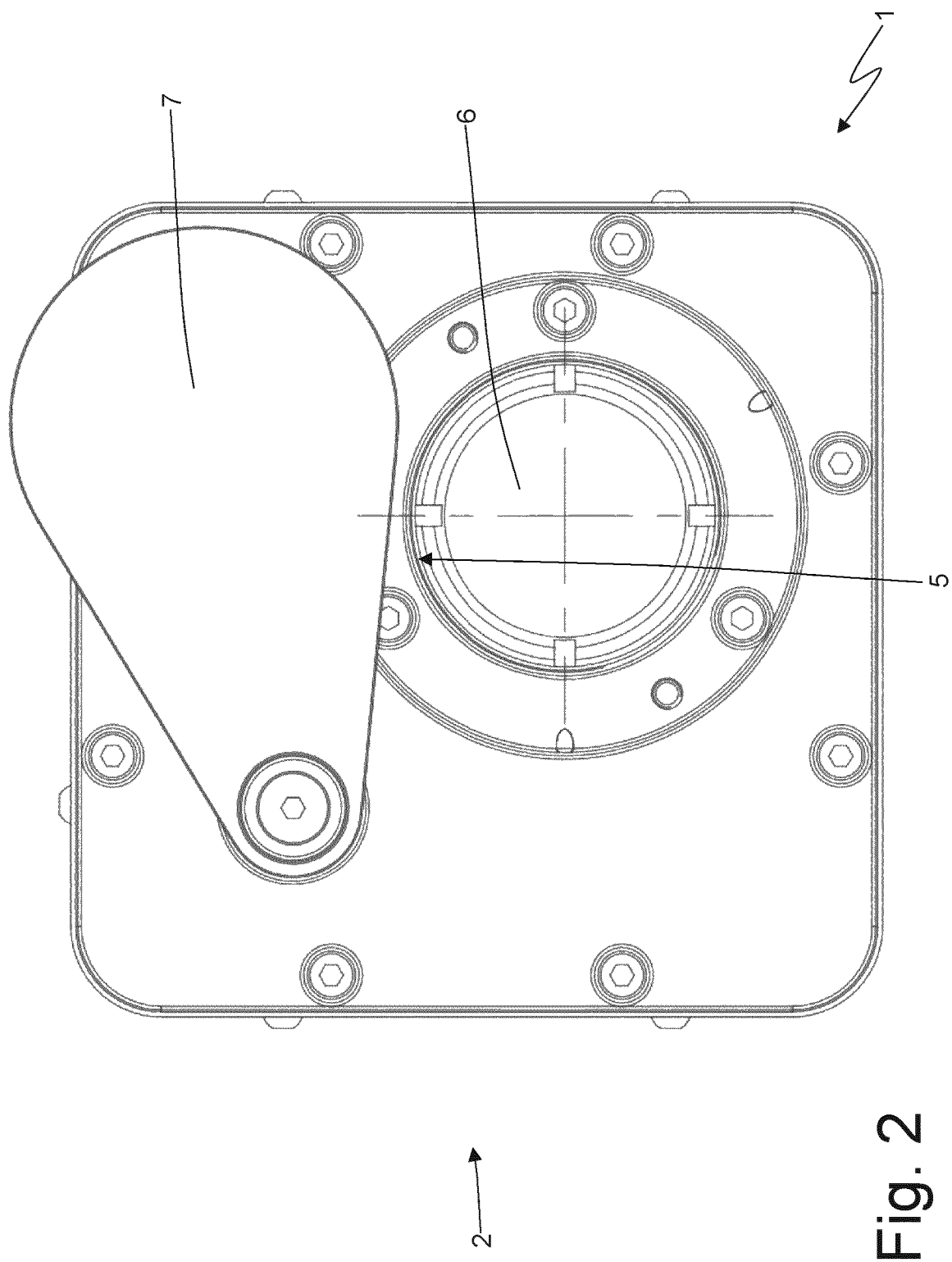
FIG. 2 is a front view of the thermal camera of FIG. 1.

As shown in FIG. 2, the protective casing 2 has a detection window 5 which is closed by a transparent screen 6 (normally made of germanium glass) and is typically arranged in line with the lens 4 of the thermal imaging detector 3 or in any case in such a way as to allow the thermal imaging detector 3 to "see" outside the protective casing 2. According to a preferred embodiment, a shutter 7 is hinged outside the protective casing 2 and rotates between an open position (illustrated in the attached figures) in which the shutter 7 does not cover the detection window 5 and a closed position (not shown) in which the shutter 7 covers the detection window 5. According to a preferred embodiment, an electric motor 8 (visible in FIGS. 4 and 5) is housed inside the protective casing 2 and is mechanically connected to the shutter 7 (if necessary a mechanical transmission reducing the rotation can be placed between the two) to move the shutter 7 between the open position and the closed position. The electric motor 8 represents one of the actuators arranged in the protective casing 2 of the thermal camera 1.

The thermal camera 1 comprises a control electronics, in particular a control unit 9 (illustrated in FIGS. 4, 5 and 6) which supervises the operation of the thermal camera assembly 1, is integrated into the protective casing 2 and is connected to the thermal imaging detector 3 for receiving the thermographic images and/or the recordings and transmitting them outside the thermal camera 1. According to a preferred embodiment, shown in the drawings, the control unit 9 is arranged inside the protective casing 2. Among other things, the control unit 9 drives the electric motor 8 in order to open the shutter 7 only for the time strictly necessary to acquire the thermographic images or recordings. As illustrated in FIG. 1, the control unit 9 communicates (i.e. sends and receives information) with an external controller, or remote controller, 10 (i.e. separate and independent from the thermal camera 1) to which it is connected by means of a single electric cable 11 for power supply and digital transmission of data. The electric cable 11 is connected to an electrical connector 12 which is mounted across the rear wall of the protective casing 2 to bring the electrical connections inside the protective casing 2.

The thermal camera 1 is therefore configured to communicate with the outside by means of a digital transmission of data carried out through the control unit 9.

The control unit 9 is also configured to receive the power supply transmitted through the electric cable 11 and distribute it to the internal components of the thermal camera 1. The control unit 9 then controls the power supply of the thermal imaging detector 3.

Figure 4:
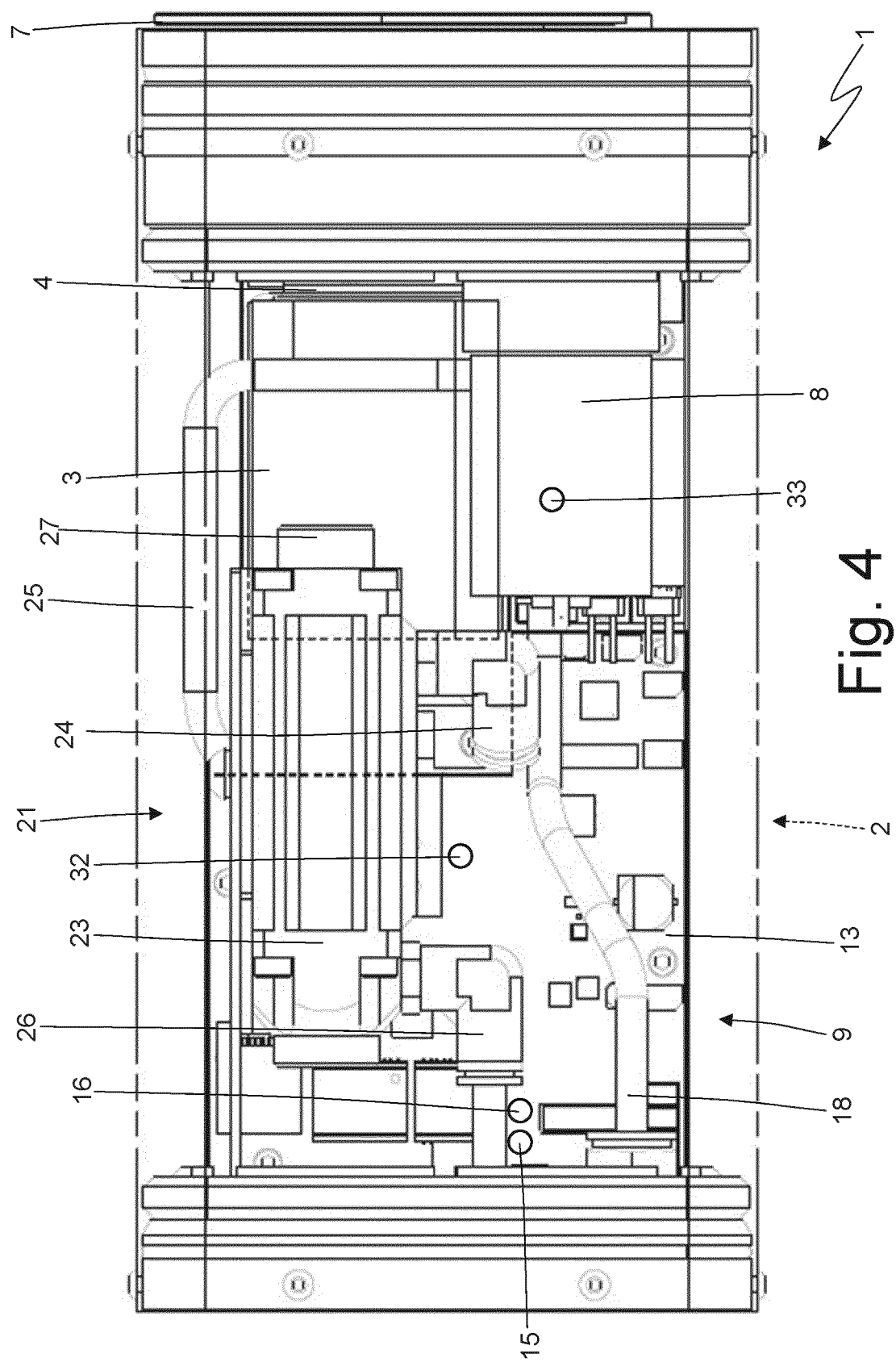
FIG. 4 is a top view of the thermal camera of FIG. 1 where part of the protective casing has been removed.
Figure 5:
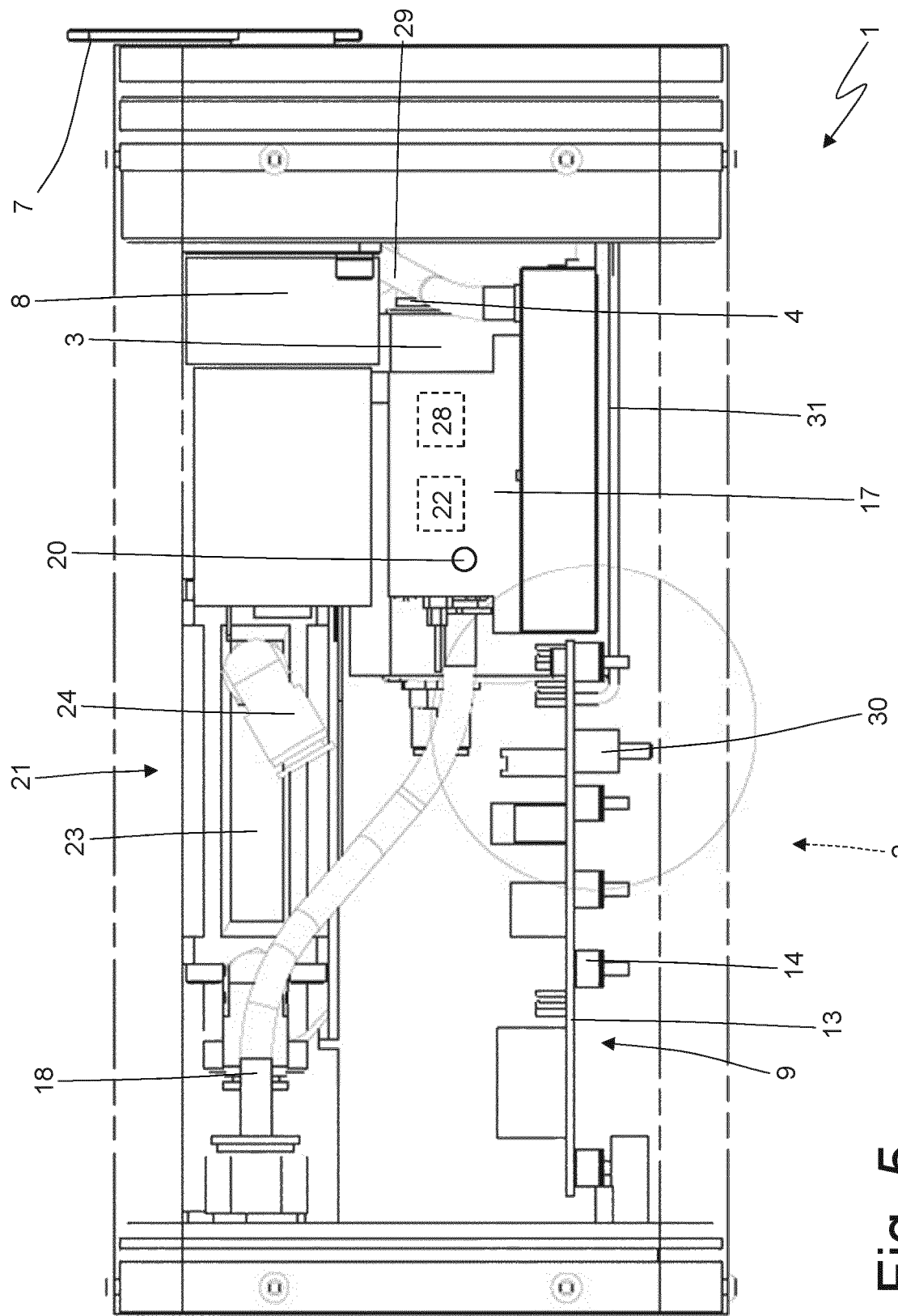
FIG. 5 is a side view of the thermal camera of FIG. 1 where part of the protective casing has been removed.
Figure 6:
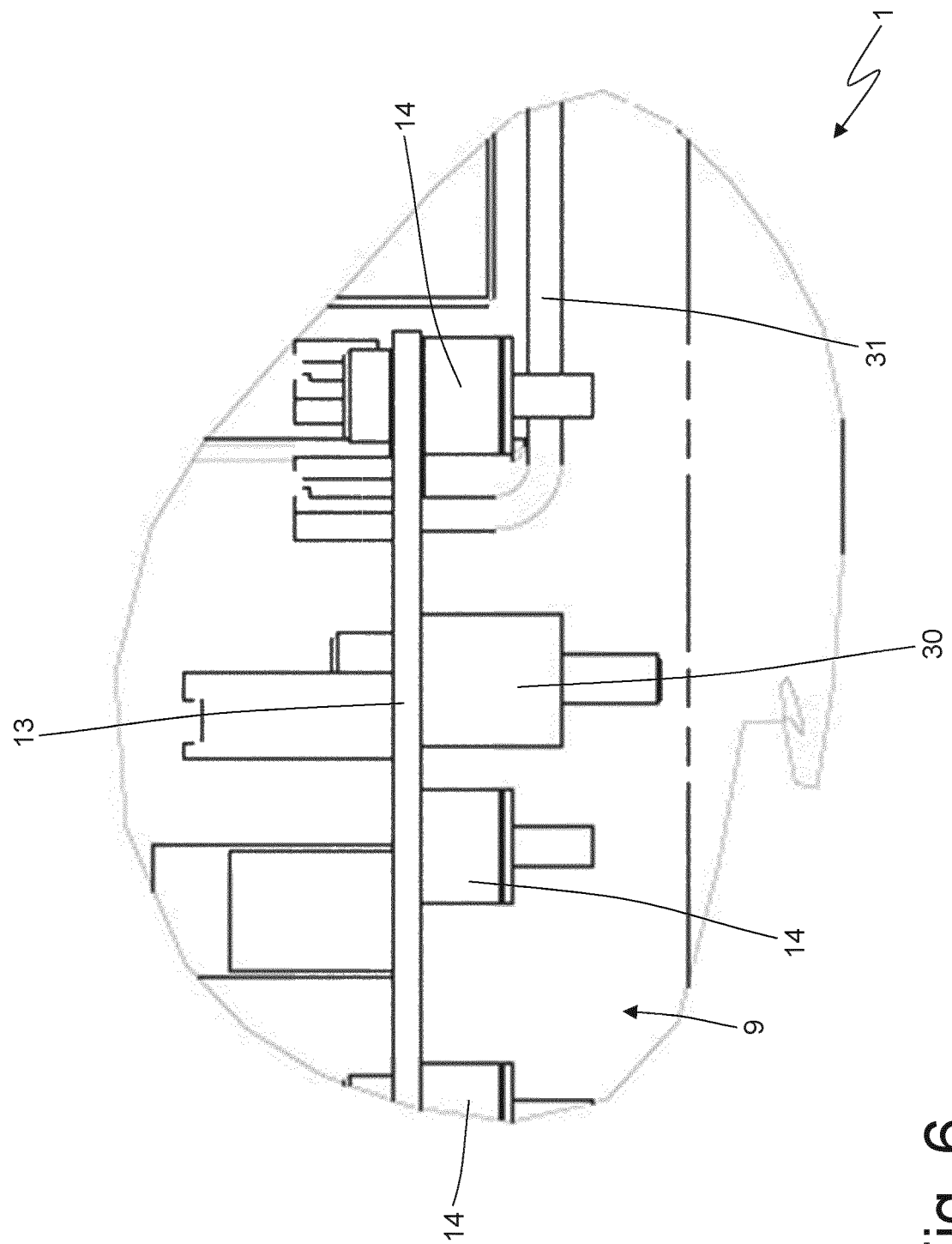
FIG. 6 is an enlarged scale view of a detail of FIG. 5.

According to what is illustrated in FIGS. 4, 5 and 6, the control unit 9 comprises for example a printed circuit board 13 which is mounted on the lower wall of the protective casing 2.

According to a preferred embodiment, shown in the figures, between the printed circuit board 13 and the wall of the protective casing 2 there are damping elements 14 (i.e. vibration dampers which dampen vibrations so that they are not transmitted from the protective casing 2 to the printed circuit board 13).

The thermal camera 1 comprises a temperature sensor 15 (schematically illustrated in FIG. 4) which is connected to the control unit 9 and measures a temperature value inside the protective casing 2. According to a preferred embodiment, the temperature sensor 15 is integrated into the control unit 9, i.e. it is mounted on the printed circuit board 13 of the control unit 9. As explained in detail below, in a preferred embodiment the control unit 9 monitors the temperature inside the protective casing 2 by means of the temperature sensor 15 and when necessary it adjusts the temperature by acting on a cooling system 21 in such a way that the temperature value does not exceed a predetermined threshold value. That is, the control unit 9 is configured to act on the cooling system (21) by means of commands to one or more actuators. More specifically, the control unit 9 acts on the cooling system 21 depending on the signal received from the temperature sensor 15. Furthermore, according to a preferred embodiment, the control unit 9 is configured to turn off the thermal imagining detector 3 (i.e. cut off the electrical power supply to the thermal imagining detector 3) in the event of an emergency, i.e. if the temperature inside the protective casing 2 exceeds a predetermined threshold value. The thermal imaging detector 3 is thus "protected" (as far as possible) by avoiding generating additional heat due to the Joule effect inside the thermal imaging detector 3, if it is not possible to correct the temperature inside the protective casing 2 adequately and the temperature reaches too high values. Furthermore, according to a preferred embodiment, the control unit 9 is configured to send an alarm signal to the external controller 10 if the temperature inside the protective casing 2 exceeds the predetermined threshold value. In other words, the control unit 9 informs the external controller 10 of an anomalous situation and requires action, if necessary, by an operator (for example if the anomalous situation is too serious or lasts too long).

The thermal camera 1 also comprises a humidity sensor 16, schematically illustrated in FIG. 4, which is connected to the control unit 9 and measures a humidity value inside the protective casing 2. According to a preferred embodiment, the humidity sensor 16 is integrated into the control unit 9, i.e. it is mounted on the printed circuit board 13 of the control unit 9. Excessive humidity inside the protective casing 2 is harmful as it could produce condensation that could fog the lens 4 of the thermal imaging detector 3, damage the electronic components and cause over time oxidation of the metal parts. According to a preferred embodiment, the control unit 9 is configured to send an alarm signal to the external controller 10 if the humidity inside the protective casing 2 exceeds a predetermined threshold value. In other words, the control unit 9 informs the external controller 10 of an anomalous situation and requires action, if necessary, by an operator (for example if the anomalous situation is too serious or lasts too long).

Figure 3:
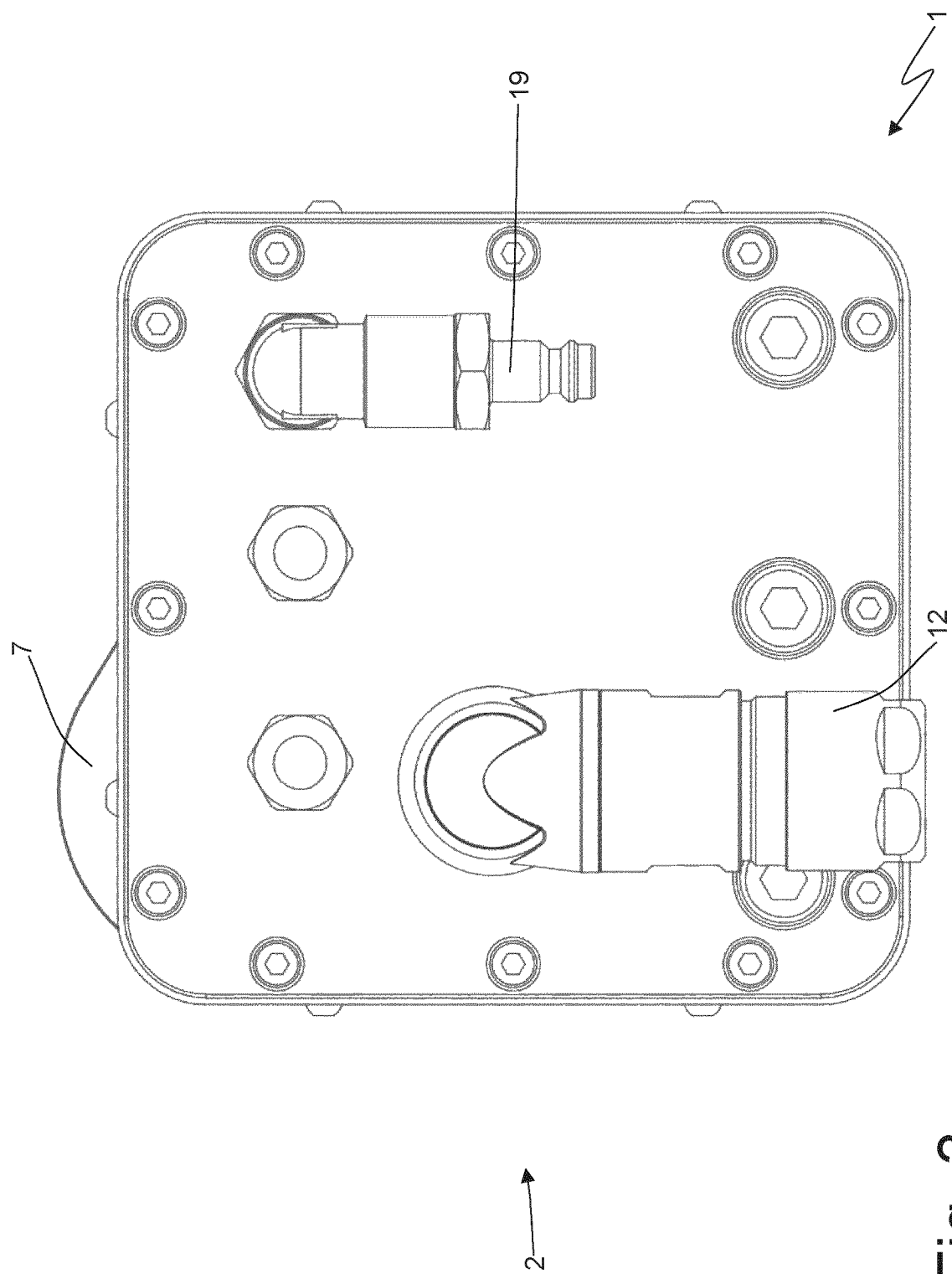
FIG. 3 is a rear view of the thermal camera of FIG. 1.

As shown in FIG. 5, the thermal camera 1 comprises a compressed air distributor 17 which receives a flow of compressed air through a pipe 18 placed inside the protective casing 2 and connects the compressed air distributor 17 to a pneumatic connector 19 (illustrated in FIGS. 1 and 3) which is mounted across the rear wall of the protective casing 2 and is connected to a compressed air source by means of a pneumatic wiring.

According to a preferred embodiment, a pressure sensor 20 is provided. It is preferably arranged in the compressed air distributor 17 and measures a pressure value of the compressed air entering the compressed air distributor 17 (i.e. entering the protective casing 2). Preferably the control unit 9 is connected to the pressure sensor 20 to read the value of the compressed air pressure entering the compressed air distributor 17 and to send an alarm signal to the external controller 10 if the pressure value exceeds a predetermined maximum threshold value and/or is lower than a predetermined minimum threshold value (i.e. if there is too much pressure or too little pressure). In other words, the control unit 9 informs the external controller 10 of an anomalous situation and requires action, if necessary, by an operator (for example if the anomalous situation is too serious or lasts too long).

According to a preferred embodiment illustrated in FIG. 5, as mentioned above a compressed air cooling system 21 is provided. It is entirely arranged inside the protective casing 2 and introduces into the protective casing 2 a flow of compressed air to lower the temperature. The control unit 9 controls the flow of compressed air towards the cooling system 21. More specifically, the compressed air distributor 17 comprises a solenoid valve 22 which is controlled by the control unit 9 and regulates the supply of compressed air to the cooling system 21; that is by opening and closing the solenoid valve 22 the control unit 9 increases or decreases the action of cooling the internal volume of the protective casing 2 performed by the cooling system 21. In a preferred embodiment, the control unit 9 measures the value of the temperature inside the protective casing 2 by means of the temperature sensor 15 and consequently controls the solenoid valve 22 (which constitutes an actuator) depending on the temperature value inside the protective casing 2. In other words, the control unit 9 is connected to the temperature sensor 15 to read the value of a physical quantity (the temperature), and is connected to the actuator (consisting of the solenoid valve 22) to control the actuator depending on the value of the physical quantity (the temperature).

According to one embodiment, the control unit 9 acts as a simple switch (with a certain hysteresis) which opens the solenoid valve 22 (i.e. "turns on" the cooling system 21) when the temperature measured by the temperature sensor 15 is higher than a predetermined threshold value and closes the solenoid valve 22 (i.e. "switches off" the cooling system 21) when the temperature measured by the temperature sensor 15 is lower than the predetermined threshold value. According to a more refined embodiment, the control unit 9 partializes the opening/closing of the solenoid valve 22 depending on the difference between the temperature measured by the temperature sensor 15 and the predetermined threshold value.

As illustrated in FIG. 4, the compressed air cooling system 21 comprises a vortex tube 23 (i.e. a Ranque-Hilsch tube) which receives a flow of compressed air at an inlet 24 (which is connected to the solenoid valve 22 of the compressed air distributor 17 by means of a pipe 25) and separates the compressed air flow into a warmer part which is directed towards a first compressed air outlet 26 facing the outside of the protective casing 2 and into a colder part which is directed towards a second compressed air outlet 27 facing the inside of the protective casing 2 (and in particular towards the thermal imaging detector 3 which is the component which most requires cooling). According to a preferred embodiment illustrated in FIG. 4, the outlet 26 of the vortex tube 23 leads to the outside through the rear wall of the protective casing 2. In other words, the vortex tube 23 allows to separate a high pressure fluid coming from the inlet 24 into two separate jets, which have very different temperature: the hottest jet is directed outside the protective casing 2 through the outlet 26 (it leads to the outside through the rear wall of the protective casing 2) while the colder jet is directed inside the protective casing 2 through the outlet 27 (facing the thermal imaging detector 3).

A preferred embodiment partially illustrated in FIG. 5 comprises a compressed air cleaning circuit which receives the compressed air from the compressed air distributor 17 and generates jets of compressed air outside the protective casing 2 at the transparent screen 6 to keep the transparent screen 6 clean. The compressed air distributor 17 comprises a solenoid valve 28 (constituting an actuator) which receives the compressed air from the pipe 18 and directs it to a further pipe 29 ending in the compressed air cleaning circuit. The solenoid valve 28 is controlled by the control unit 9 which opens it (i.e. activates the compressed air cleaning circuit) whenever the shutter 7 is opened. According to a possible embodiment, the compressed air cleaning circuit comprises an annular duct which is arranged all around the detection window 5 and has openings, or air channeling ducts, which extend radially to generate as many compressed air jets directed towards the center of the detection window 5.

According to a preferred embodiment illustrated in FIGS. 5 and 6, the thermal imaging detector 3 is mounted on the lower wall of the protective casing 2 and damping elements 30 (i.e. vibration dampers which dampen vibrations so that they are not transmitted from the protective casing 2 to the thermal imaging detector 3) are placed therebetween. The damping elements 30 that support the thermal imaging detector 3 are different (in size and/or composition) from the damper elements 14 that support the printed circuit board 13 of the control unit 9 because the thermal imaging detector 3 has a much greater mass than the printed circuit board 13 and also because the thermal imaging detector 3 has a different sensitivity to vibrations with respect to the printed circuit board 13.

According to a preferred embodiment, the thermal imaging detector 3 is placed in (mounted on) a support, for example a metal cradle 31, which is fixed to the lower wall of the protective casing 2 and damping elements are placed therebetween.

The thermal camera 1 comprises at least one inertial sensor 32, preferably a triaxial acceleration sensor, or accelerometer (schematically illustrated in FIG. 4), which is connected to the control unit 9 and measures the values of the accelerations which the protective casing 2 undergoes. According to a preferred embodiment, the accelerometer 32 is integrated into the control unit 9; more specifically it is mounted on the printed circuit board 13 of the control unit 9. According to a preferred embodiment, the control unit 9 is configured to send an alarm signal to the external controller 10 if the instantaneous accelerations which the protective casing 2 undergoes exceed, as a whole or individually, a predetermined threshold value. In other words, the control unit 9 informs the external controller 10 of an anomalous situation and requires action, if necessary, by an operator (for example if the anomalous situation is too serious or lasts too long). In particular, vibrations that are detected may be caused for example by a non-optimal (i.e. too "loose") fastening of the protective casing 2 to its support, by impacts suffered by the protective casing 2, or by movements of the support to which the thermal camera is fixed during the normal operation in an industrial plant.

According to a possible embodiment, the control unit 9 is configured to process the signal of the inertial sensor 32 in a known way to obtain information on the spatial arrangement of the protective casing 2 and of the thermal camera 1 in general. Such information can be used for example to restore the correct spatial arrangement of the protective casing 2 following shocks or when the protective casing 2 is mounted again after it has been removed to carry out for example a maintenance intervention. The information relating to the spatial arrangement of the protective casing 2 can also be used to send an alarm signal to the external controller 10, a signal indicative of unwanted movements undergone by the thermal camera 1 with respect to its initial position.

Alternatively or in addition to the accelerometer, inertial sensors of different types, for example gyroscopic, can be provided to detect the spatial arrangement of the protective casing 2.

According to a possible embodiment, the thermal camera 1 comprises a position sensor 33 (schematically illustrated in FIG. 4) which directly or indirectly detects the position of the shutter 7. For example the position sensor 33 could be coupled to the electric motor 8 (to detect the position of the shaft of the electric motor 8 mechanically connected to the shutter 7) as shown in FIG. 4 or could be mounted on the front wall of the protective casing 2 (to detect the position of the shutter 7 directly). The control unit 9 is connected to the position sensor 33 to read the position of the shutter 7 and to send an alarm signal to the external controller 10 if the position of the shutter 7 does not change within the expected time frame when the electric motor 8 is started. For instance, the position sensor 33 may consist of a pair of sensors to detect two different positions of the shutter 7 (closed or open).

In summary, the thermal camera comprises one or more sensors arranged in the protective casing 2 to provide signals indicative of a physical quantity or a state. These sensors may include the temperature sensor 15, the humidity sensor 16, the pressure sensor 20, the position sensor 33 and the accelerometer 32.

Furthermore, the thermal camera 1 comprises one or more actuators also arranged in the protective casing 2, such as the solenoid valves 22 and 28 and the electric motor 8.

The control unit 9 is connected, in addition to the thermal imaging detector 3, to the sensors to receive the signals that they provide and to the actuators to control the latter depending on the signals received from the sensors.

As already mentioned, the control unit 9 controls the power supply of the internal components of the thermal camera, and therefore controls the power supply of the thermal imaging detector 3, the sensors and the actuators.

According to a preferred embodiment, at least a part of the protective casing 2 is provided with thermal insulation. The inner face of the walls (all the walls or at least some of them) of the protective casing 2 is provided with thermal insulation; for example, the metal walls of the protective casing 2 could internally have a chamber which is left empty or is partially or completely filled with heat-insulating materials. This increases the thermal efficiency of the protective casing 2 and of the thermal camera 1 in general.

From the above, it is evident that the external controller 10 communicates only with the control unit 9, which is entirely arranged inside the protective casing 2 and in any case integrated into the protective casing 2 in the preferred embodiment. The control unit 9 is the only component of the thermal camera 1 that communicates with the outside (i.e. with the external controller 10). Therefore, the thermal imaging detector 3 is connected only and exclusively to the control unit 9 which is in charge of sorting and transmitting the digital data from and to the thermal imaging detector 3. In other words, the control unit 9 (i.e. the control electronics of the thermal camera 1) which is connected to the external controller 10 is responsible for sorting and transmitting the digital data to and from the thermal imaging detector 3.

In the embodiment illustrated in the attached figures, the control unit 9 is entirely arranged inside the protective casing 2 and is mounted on the lower wall of the protective casing 2. According to an alternative embodiment (not shown), the control unit 9 could be arranged inside the thermal imaging detector 3; more specifically, the control unit 9 could be integrated with the electronics of the thermal imaging detector 3 (in this embodiment too, the control unit 9 is entirely arranged inside the protective casing 2).

The control unit 9, which can be defined as "intelligent", can be configured to receive information and/or data from the components (thermal imaging detector 3, sensors, actuators, etc.) of the thermal camera 1, process such information and/or data autonomously, and control the components of the thermal camera 1 directly, sending to the external controller 10 only reports and/or alarm signals depending on the signals received from the sensors. Alternatively, the control unit 9 can just collect information and/or data from the internal components of the thermal camera, sending them to the external controller 10 and receiving instructions from the latter on how to control the components. Intermediate solutions are also possible in which the control unit 9 directly manages and controls the internal components in response to some signals, while, in response to other signals, it seeks instructions from the external controller 10 on how to control the internal components.

According to a preferred embodiment, the control unit 9 is able to process autonomously the thermographic images and/or recordings collected by the thermal imaging detector 3 and to send to the external controller the thermographic images and/or recordings after having processed them. Unlike known thermal cameras which must delegate the processing of the thermographic images and/or recordings to an external processor, the thermal camera 1 of the present invention can therefore carry out processing operations in an autonomous way and can be used in an industrial plant and be integrated into an industrial production process without the need for an external processor. The present invention also relates to a control method for controlling an industrial production process in an industrial production environment by means of a thermal camera assembly which comprises a protective casing including a window closed by a transparent screen and housing a thermal imaging detector, one or more sensors, one or more actuators, and an integrated control unit directly connected to the thermal imaging detector, the sensor(s) and the actuator(s). The method according to the invention comprises the steps of positioning the thermal camera assembly with respect to a target at which the thermal camera assembly must point within the industrial production environment, acquiring by means of the thermal imaging detector at least one thermographic image or recording of a portion of an object or of a material that is in correspondence of the target and is used or processed during the industrial production process, sending the thermographic image(s) and/or recording(s) to the integrated control unit, processing the thermographic image(s) or recording(s) in the integrated control unit to obtain at least one processed thermographic image and/or recording, transmitting the processed thermographic image(s) and/or recording(s) to the outside by means of a digital transmission of data carried out exclusively through the control unit, and controlling at least one part of the industrial production process using the processed thermographic image(s) and/or recording(s).

The control method according to the present invention can be applied, for example, in a foundry to check the temperature of objects such as molds, to hot forming processes and rolling processes to check the temperature changes in the material, more specifically the metal, undergoing the forming process, to inertia welding processes to check the temperature of welded material, to industrial furnace plants to check the temperature of melted metals and even to additive manufacturing processes.

The embodiments herein described can be combined with each other without departing from the scope of protection of the present invention.

The thermal camera 1 described above provides several advantages.

First of all, the electric cable 11 (a single cable for power supply and digital transmission of data) has a relatively small diameter, that is a relatively small thickness. As a consequence it can be bent even into bends with a small curvature radius thereby simplifying considerably the running when several close obstacles are present. Moreover the use of the thermal camera 1 in plants where the thermal camera is subjected to movements is greatly facilitated. In other words, a single digital connection between the external controller 10 and the thermal camera 1 (i.e. the control unit 9 of the thermal camera 1) allows to reduce significantly the diameter of the electric cable 11, so reducing the curvature radius and simplifying the installation and the moving operations of the thermal camera 1. The reduced size of the electric cable 11 also allows to use an electrical connector 12 with considerably reduced dimensions. Furthermore, the electric cable 11 can be divided into sections which are connected to each other by means of releasable connectors. In this case, only the sections of the electric cable 11 that are the most exposed to harsh environmental conditions must be protected by means of a special sheath, while the sections of the electric cable 11 that are less exposed to harsh environmental conditions may not have a protective sheath.

The results obtained and the advantages provided by a thermal camera 1 according to the present invention are possible because the control unit 9 is integrated into, for example completely arranged inside, the protective casing 2 and is able to manage and control the communication between all components of the thermal camera 1 and the external controller 10. If configured to do so, the control unit 9 can also control the various components of the thermal camera 1 independently, that is without requiring an external command provided by the external controller 10.

In the thermal camera 1 described above the values measured by the various sensors can be used locally to generate alarm signals or can be communicated to the external controller 10 for diagnostic and data logging functions.

The thermal camera 1 described above measures the pressure of the inlet compressed air by means of the pressure sensor 20, thereby ensuring that the pneumatic action is always adequate and effective.

The thermal camera 1 described above measures humidity by means of the humidity sensor 16, thereby verifying that no humidity is introduced inside the protective casing 2 due to the pneumatic system or due to leaks in the protective casing 2.

The thermal camera 1 described above measures accelerations, more particularly dynamic accelerations, to which the thermal imager is subjected by means of at least one inertial sensor, for example a triaxial accelerometer, thereby checking the stresses to which the thermal camera 1 is subjected during the normal operation cycle.

The thermal camera 1 described above measures accelerations, more particularly static accelerations, to which the thermal camera is subjected by means of at least one inertial sensor, for example a triaxial accelerometer and/or a gyroscopic sensor, thereby monitoring the spatial arrangement of the thermal camera 1 and verifying its correct fastening and any changes in position due to loss of clamping forces in the supports or collisions or improper operations during the operator's actions on the machine.

The inertial sensor can be made for example with MEMS technology.

The thermal camera 1 described above measures the temperature by means of the temperature sensor 15; the thermal condition inside the protective casing 2 is thus adjusted to regulate effectively the cooling system 21 and guarantee that the thermal imaging detector 3 is not subjected to excessive temperatures.

The presence of a shutter actuated by an electric motor allows the thermal camera 1 to work, if the environmental conditions are right, even without a pneumatic connection. It also allows to reduce compressed air consumption. If the environmental conditions are right, the thermal camera 1 may not have indeed the cooling system 21. The absence of a pneumatic connection provides not only economic advantages but also ecological advantages, because the use of compressed air generally involves a high energy consumption.

The presence of a cooling system 21 that is entirely placed inside the protective casing 2 and of the thermal insulation in the protective casing 2 allow to reduce the consumption of compressed air used for cooling.

Placing vibration dampers (damping elements 14 and 30) increases the resistance to external stresses. In addition to the previously described damping elements 14 and 30, it is possible to provide further and/or different vibration dampers for protecting other "sensitive" components of the thermal camera 1 such as the solenoid valves or the electric motor.

The present invention also relates to a control system for monitoring and controlling an industrial production process in an industrial production environment which comprises a thermal camera 1 as described above and power supply and processing means. Such power supply and processing means comprise the control unit 9 integrated into the thermal camera 1 and the external controller 10.

As described above, according to a preferred embodiment, the control unit 9, and more generally the thermal camera 1, is connected to the external controller 10 by means of a single electric cable 11 for power supply and digital transmission of data.

The invention claimed is:

1. A thermal camera assembly for monitoring and controlling an industrial production process in an industrial production environment, the thermal camera assembly comprising:
   a protective casing defining a window closed by a transparent screen;
   a thermal imaging detector arranged in the protective casing, the thermal imaging detector configured to detect thermographic images and/or thermographic recordings through the transparent screen;
   one or more sensors arranged in the protective casing, the one or more sensors configured to provide signals indicative of a physical quantity or a state;
   one or more actuators arranged in the protective casing;
   a cooling system arranged entirely inside the protective casing, the cooling system comprising a vortex tube configured to receive a single flow of compressed air through an inlet and to separate the single flow of compressed air into a warm air flow which is directed outside the protective casing through a first compressed air outlet and into a cold air flow which is directed inside the protective casing through a second compressed air outlet; and
   a control unit arranged in the protective casing and directly connected to the thermal imaging detector, the one or more sensors, and the one or more actuators, the control unit configured to;
      receive and transmit the thermographic images and/or thermographic recordings,
      receive the signals indicative of the physical quantity or the state,
      control the one or more actuators based on the received signals indicative of the physical quantity or the state, and
      actuate the cooling system by controlling the one or more actuators,
   wherein the thermal camera assembly is configured to communicate with a device outside of the protective casing via digital transmission of data carried out exclusively through the control unit.

2. The thermal camera assembly of claim 1, further comprising a single electric cable connected to the control unit, the single electrical cable configured to digitally transmit the data and to supply power to the thermal camera assembly.

3. The thermal camera assembly of claim 1, wherein the control unit is further configured to transmit alarm signals based on the signals indicative of the physical quantity or the state.

4. The thermal camera assembly of claim 1, wherein the control unit is further configured to control the supply of power to the thermal imaging detector.

5. The thermal camera assembly of claim 1, wherein the one or more sensors comprise a temperature sensor configured to provide a signal indicative of the temperature in the protective casing.

6. The thermal camera assembly of claim 5, wherein the control unit is further configured to actuate the cooling system based on the signal indicative of the temperature in the protective casing.

7. The thermal camera assembly of claim 1, further comprising a damping element placed between the thermal imaging detector and the protective casing.

8. The thermal camera assembly of claim 1, wherein at least part of the protective casing is provided with thermal insulation.

9. The thermal camera assembly of claim 1, wherein the control unit is further configured to control the supply of power to the one or more sensors and the one or more actuators.

10. The thermal camera assembly of claim 1, wherein the one or more sensors comprise at least one inertial sensor configured to provide a signal indicative of acceleration undergone by the protective casing.

11. The thermal camera assembly of claim 10, wherein the at least one inertial sensor is integrated into the control unit.

12. The thermal camera assembly of claim 10, wherein the at least one inertial sensor is a triaxial acceleration sensor.

13. The thermal camera assembly of claim 10, wherein the control unit is further configured to transmit an alarm signal when the acceleration undergone by the protective casing at a point in time exceeds a threshold value.

14. The thermal camera assembly of claim 10, wherein the control unit is further configured to process the signal indicative of the acceleration undergone by the protective casing to determine a spatial arrangement of the protective casing.

15. The thermal camera assembly of claim 14, wherein the control unit is further configured to transmit an alarm signal when the protective casing undergoes displacement with respect to an initial position of the protective casing.

16. The thermal camera assembly of claim 1, wherein the control unit is further configured to autonomously process the thermographic image and/or thermographic recording and to transmit the processed thermographic image and/or thermographic recording.

17. A control system for monitoring and controlling an industrial production process in an industrial production environment, the control system comprising:
   the thermal camera assembly of claim 1; and
   a power supply and processing arrangement,
   wherein the power supply and processing arrangement comprises the control unit and an external controller in electrical communication with the control unit.

18. A method for monitoring and controlling an industrial production process in an industrial production environment using a thermal camera assembly comprising a protective casing housing a thermal imaging detector, one or more sensors, one or more actuators, a cooling system, and a control unit directly connected to the thermal imaging detector, the method comprising:
   pointing the thermal camera assembly at a target within the industrial production environment;
   acquiring at least one thermographic image and/or thermographic recording of a portion of an object or of a material of the target;
   transmitting the at least one thermographic image and/or thermographic recording to the control unit;
   processing the at least one thermographic image and/or thermographic recording to obtain at least one processed thermographic image and/or thermographic recording;
   digitally transmitting the at least one processed thermographic image and/or thermographic recording exclusively through the control unit to a system outside of the thermal camera assembly via a single electric cable; and
   controlling at least part of the industrial production process based on the at least one processed thermographic image and/or thermographic recording.

19. The method of claim 18, further comprising:
receiving signals indicative of a physical quantity or a state from the one or more sensors; and
controlling the one or more actuators based on the received signals indicative of the physical quantity or the state.

20. The method of claim 18, wherein the one or more sensors comprise at least one inertial sensor, the method further comprising:
receiving a signal indicative of acceleration undergone by the thermal camera assembly.

21. The method of claim 20, further comprising:
processing the signal indicative of the acceleration undergone by the thermal camera assembly to determine a spatial arrangement of the thermal camera assembly.

22. The method of claim 20, further comprising generating an alarm signal when the acceleration undergone by the thermal camera assembly exceeds a threshold value.

23. The method of claim 18, wherein the cooling system comprises a vortex tube configured to separate a single flow of compressed air into a warm air flow and a cold air flow further directed inside the protective casing,
the method further comprising cooling the thermal camera assembly using the cold air flow.

24. The thermal camera assembly of claim 1, further comprising a single electric cable configured to digitally transmit the data carried out exclusively through the control unit.

* * * * *